United States Patent
Hess et al.

(10) Patent No.: US 10,343,308 B2
(45) Date of Patent: Jul. 9, 2019

(54) EQUIPMENT AND METHOD FOR THE GENERATIVE MANUFACTURE AND/OR REPAIR OF COMPONENTS

(71) Applicant: MTU Aero Engines AG, Munich (DE)

(72) Inventors: Thomas Hess, Munich (DE); Georg Schlick, Munich (DE); Alexander Ladewig, Bad Wiessee (DE)

(73) Assignee: MTU Aero Engines AG, Munich (DE)

( * ) Notice: Subject to any disclaimer, the term of this patent is extended or adjusted under 35 U.S.C. 154(b) by 248 days.

(21) Appl. No.: 14/797,309

(22) Filed: Jul. 13, 2015

(65) Prior Publication Data
US 2016/0016336 A1   Jan. 21, 2016

(30) Foreign Application Priority Data

Jul. 17, 2014 (EP) .................................. 14177355

(51) Int. Cl.
| B29C 35/02 | (2006.01) |
| B22F 3/105 | (2006.01) |
| B33Y 10/00 | (2015.01) |
| B33Y 30/00 | (2015.01) |
| B29C 35/08 | (2006.01) |

(Continued)

(52) U.S. Cl.
CPC ........ B29C 35/0266 (2013.01); B22F 3/1055 (2013.01); B29C 35/0805 (2013.01); B33Y 10/00 (2014.12); B33Y 30/00 (2014.12); C25D 13/00 (2013.01); *B22F 2003/1056* (2013.01); *B22F 2999/00* (2013.01); *B29C 64/153* (2017.08); *B29C 2035/0838* (2013.01); *Y02P 10/295* (2015.11)

(58) Field of Classification Search
CPC ............ B29C 35/0266; B29C 35/0805; B29C 67/0085; B29C 67/0077; B29C 2035/0838; B33Y 10/00; B33Y 30/00; B22F 3/1055; B22F 2003/1056; B22F 2999/00; C25D 13/00; Y02P 10/295; B29L 2031/772

See application file for complete search history.

(56) References Cited

U.S. PATENT DOCUMENTS 6,136,257 A * 10/2000 Graf ....................... B22F 3/004
                                                           118/308
6,363,606 B1   4/2002 Johnson, Jr. et al.
(Continued)

FOREIGN PATENT DOCUMENTS

| DE | 10 2012 014 577 A1 | 1/2014 |
| EP | 2 695 725 A1 | 2/2014 |
| JP | 2007313536 A | 12/2007 |

*Primary Examiner* — Xiuyu Tai
(74) *Attorney, Agent, or Firm* — Barlow, Josephs & Holmes, Ltd

(57) ABSTRACT

Equipment for the generative manufacture and/or repair of components, in particular of gas turbines, includes a solidifying means for the layer-by-layer, local, particularly optical, thermal, and/or chemical solidification of particularly powdered, granular, and/or fluid material, and an electrodeposition means for the electrostatic deposition of particles and/or gas from a region between a layer of material, which is to be solidified or is solidified, and the solidifying means, as well as a method for the generative manufacture and/or repair of components, in particular of gas turbines, by means of such equipment.

9 Claims, 2 Drawing Sheets

(51) Int. Cl.
*C25D 13/00* (2006.01)
*B29C 64/153* (2017.01)

(56) References Cited

U.S. PATENT DOCUMENTS

| | | | |
|---|---|---|---|
| 2006/0003095 A1* | 1/2006 | Bullen | B22F 3/004 |
| | | | 427/180 |
| 2012/0251378 A1 | 10/2012 | Abe et al. | |
| 2014/0061977 A1* | 3/2014 | Silvanus | B22F 3/1055 |
| | | | 264/484 |
| 2015/0022790 A1* | 1/2015 | Johnson | B05C 9/12 |
| | | | 355/27 |
| 2016/0175929 A1* | 6/2016 | Colin | C04B 35/62839 |
| | | | 419/23 |

* cited by examiner

EQUIPMENT AND METHOD FOR THE GENERATIVE MANUFACTURE AND/OR REPAIR OF COMPONENTS

BACKGROUND OF THE INVENTION

The present invention relates to equipment and a method for the generative manufacture and/or repair of components, in particular of gas turbines.

Particularly complex and/or highly stressed components, such as the blades of gas turbines, can be manufactured and repaired advantageously by generative or additive methods. Here, material is locally solidified layer by layer and bonded to an adjacent layer of already solidified material. In this process, in order to newly manufacture a component, a first layer is solidified on a platform, from which it is detached after manufacture of the component is completed. In order to repair an already existing component, it is positioned on the platform and a first layer is solidified on the component.

Particularly the arrangement of a new layer of material to be solidified and/or its solidification enables particles and/or gas to enter into the region between the layer of material that is to be solidified or has been solidified and a solidifying means. Thus, for example, particles can be stirred up when powdered material is deposited and/or distributed. Additionally or alternatively, it is possible, for example, for smoldered residues to rise during a solidifying. The latter can then condense to particles between the layer and the solidification means.

Similarly, it is possible for other particles, such as, for example, dust or the like, and/or gas from the surroundings to enter the region between the layer and the solidifying means.

In particular, such particles and such gas can interfere with exposure of the material being solidified by the solidifying means; for example, they can deflect and/or reflect a laser beam. Additionally or alternatively, they can also have a detrimental effect on the material that is to be solidified or is solidified; for example, they can form inclusions therein, or a surface layer, or the like.

SUMMARY OF THE INVENTION

An object of one embodiment of the present invention is to improve the generative manufacture and/or repair of components.

This object is achieved by the equipment and method of the present invention.

According to an aspect of the present invention, the equipment for the generative manufacture and/or repair of components, in particular of gas turbines, has a solidification means for the layer-by-layer and local solidification of material to be solidified.

In one embodiment, the material being solidified is powdered or granular. Equally, it can also be fluid, in particular a paste. In one embodiment, the material can be exposed to the solidification means optically, preferably by an illuminant, in particular a laser, and hereby solidified or set up for this solidification. Equally, in one embodiment, the material can be exposed to the solidification means thermally, preferably by a heating or cooling medium, and hereby solidified or set up for this solidification. Equally, in one embodiment, the material can be exposed to the solidification means chemically, preferably by a printer head, and hereby solidified or set up for this solidification.

In one embodiment, the equipment has a holder for the material to be solidified, in particular one containing the material to be solidified. In an enhancement, the holder has a container, in particular a framelike container, for the material to be solidified, in particular one containing the material to be solidified, in particular a powder bed. Additionally or alternatively, in an enhancement, the holder has a platform, on which, in one embodiment, a first layer, which is detached from the platform when manufacture of the component is completed, or an already present component is positioned, or which is provided or set up for this. In one embodiment, the platform and container can be displaced with respect to each other so as to arrange new layers of the material being solidified in each case. In particular, the platform can travel or be displaced in the container, which, is particularly stationary. Equally, the container can travel or be displaced on the platform, which is particularly stationary.

In one embodiment, the equipment has a layering means for successive arrangement of layers of the material to be solidified onto layers of already solidified material. In an enhancement, the layering means has a dispensing means for dispensing material to be solidified, in particular, an additional container, which preferably can travel and/or has a closable dispensing opening. Additionally or alternatively, in an enhancement, the layering means comprises a distributing means, which can preferably travel, for distributing material to be solidified for a layer of material to be solidified, in particular a traveling rake, doctor blade, spatula, slide, wiper, or the like. Preferably, the dispensing and/or distributing means are displaceable in relation to the holder, in particular the container and/or platform.

According to an aspect of the present invention, the equipment has an electrodeposition means for electrostatic deposition of particles and/or gas from a region between a layer of material that is to be solidified and/or is solidified and the solidifying means, in particular a region between the holder and the solidifying means.

By means of such an electrodeposition means, which is known as such to the person skilled in the art of (dust) electrofilters, electrical gas purification, electrostatic precipitators, or (dust) electrodepositors in particular, interfering particles and/or interfering gas can be removed from the region between a layer of material that is at least partially still to be solidified and/or is at least partially already solidified and the solidifying means in an advantageous manner. In this way, in one embodiment, any interference of exposure of the material to be solidified to the solidifying means by such particles or such gas can be reduced, preferably at least substantially prevented. Additionally or alternatively, in one embodiment, any impairment of a layer of material that is to be solidified and/or is solidified by such particles or such gas can be reduced and preferably at least substantially prevented.

In one embodiment, the electrodeposition means deposits particles and/or gas electrostatically or is provided or set up for this, said particles or gas entering into the region through arrangement of a new layer of material to be solidified and/or through its solidification, in particular stirred-up particles of powdered material and/or smoldered residues, in particular residues that were formed during solidification of the material and have condensed to particles. Additionally or alternatively, in one embodiment, the electrodeposition means electrostatically deposits other particles and/or other gas such as, for example, dust or the like, from the surroundings or is provided or set up for this.

In one embodiment, the electrodeposition means deposits the particles electrostatically or is set for this, the size and/or mass of the particles, in particular the maximum or averaged size and/or mass, being at most half, in particular at most 10% of the size or mass, in particular a maximum or averaged size or mass, of the material to be solidified, in particular a granular or powdered material, and/or is at most 0.1 mm, in particular at most 10 μm, particularly relative to particles arising from condensed smoldered residues that form during the solidification. As a result, interfering particles can be removed advantageously on the one hand, while, on the other hand, the material to be solidified is itself not affected or only slightly affected.

In one embodiment, the electrodeposition means has a single-part or multipart deposition electrode as well as a single-part or multipart counter electrode, in particular a spray electrode. The deposition electrode and/or the counter electrode is/are or can be arranged, in particular, lateral to and/or above or on a side, lying opposite the layer, of the region between the layer that is to be solidified and/or is solidified and the solidifying means, from which the particles and/or the gas is/are deposited and, in particular, delimit this region. They can each have, in particular, one or more tubes or plates, particularly flat plates. Plates, in particular, can be advantageously cleaned and/or bring about an advantageous flow of the particles to be deposited or of the gas to be deposited.

In one embodiment, the counter electrode is or will be spaced at least 1 cm and/or at most 100 cm, in particular at most 50 cm, preferably at most 10 cm, from the deposition electrode. In one embodiment, the electrodeposition means has a voltage source for application of a DC or AC voltage between the deposition electrode and the counter electrode, in particular one of at least 15 kV, in particular at least 25 kV and/or at most 85 kV, in particular at most 75 kV, and, in an enhancement, a control means, in particular, a programmable control means, for controlling a voltage applied between the deposition electrode and the counter electrode. A control is understood in the present case to mean, in particular, a regulation or the specification of a one-dimensional or multidimensional correcting variable based on a predetermined theoretical value and a detected, fed back, actual measured value.

In one embodiment, the control means controls a voltage applied between the deposition electrode and the counter electrode, in particular as a function of a local solidification of a layer of material and/or a concentration, in particular a measured concentration, of particles to be deposited and/or gas to be deposited in the region, or is set up for this.

The control means can apply a voltage for the deposition of particles and/or gas or can be set up for this, in particular, when a measured concentration of particles to be deposited or gas to be deposited in the region exceeds the preset limit value or, in each case, during a solidification of a layer of material and/or for a predetermined time before and/or after. Additionally or alternatively, in one embodiment, the control means can define the value of an applied voltage as a function of a measured concentration of particles to be deposited and/or gas to be deposited in the region, for example, in proportion thereto, or can be set up for this.

In one embodiment, one or more electrodes, in particular, the aforementioned deposition electrode and/or counter electrode are fixed in position in the holder or are stationary in relation to the holder.

In an enhancement, one or more electrodes, in particular the aforementioned deposition electrode and/or counter electrode, are fixed in place at the container or are stationary in relation to the container of the holder. In particular, such an electrode can have a container wall of the container or a container wall of the container can form such an electrode, preferably in that the container wall will be or is connected to the voltage source in an electrically conductive manner. Equally, an electrode that is fixed in place at the container is or can be electrically insulated opposite a wall of the container. Additionally or alternatively, in one embodiment, one or more electrodes, in particular the aforementioned deposition electrode and/or counter electrode, can be fixed in place at the platform or be stationary in relation to the platform of the holder. In particular, the platform is or can be connected to the voltage source in an electrically conductive manner. Thus, in one embodiment, a potential difference or voltage can be or is applied by the voltage source between an electrode that is electrically insulated with respect to a wall of the container, in particular, a one-part or multipart deposition electrode or counter electrode, and an electrode that is connected in an electrically conductive manner to the container or the platform, in particular, a one-part or multipart counter electrode or deposition electrode, in particular, being controlled by control means.

Equally, one or more electrodes of the electrodeposition means, in particular, the aforementioned deposition electrode and/or counter electrode, can be or is/are displaced in relation to the holder, in particular by a motor. In this way, in one embodiment, it is possible to prevent, for example, any interference with a layering means of the equipment. Additionally or alternatively, the electrostatic deposition or the electric field created by the applied voltage can thus be predetermined and, in particular, it can be changed. Thus, for example, a flow of particles to be deposited or gas to be deposited can be varied by reorientation of the deposition electrode, and/or the strength of the electric field can be changed by distancing it from the counter electrode and thus, in each case, can be adapted to the process.

In an enhancement, a displaceable electrode is arranged in fixed position with respect to the solidifying means or at the solidifying means. In this way, the electrode can advantageously travel together with the displacement means, with it being possible to have the electrode that is fixed in position with respect to the solidifying means being, in turn, still displaceable at the displacement means or fixed in stationary position.

In one embodiment, a cleaning means of the electrodeposition means cleans a deposition electrode of the electrodeposition means or is provided or set up for this. The cleaning means can clean the deposition electrode, in particular continuously, by rinsing it, for instance, or intermittently, for instance by knocking it with a hammer mechanism or the like before, during, and/or after the solidification of a layer or can be provided or set up for this.

In one embodiment, an ionization means of the electrodeposition means ionizes gas in the region between a layer of material that is to be solidified and/or is solidified and the solidifying means, from which particles and/or gas is/are deposited, before, during, and/or after the local solidification of this layer or is provided or set up for this. The ionization means can have, in particular, the deposition electrode and/or spray electrode, which, by means of an appropriately applied voltage, can ionize the gas, which, in turn, can charge particles electrostatically and thus can enhance the electrostatic deposition thereof. When such an enhancement is not required—in particular when the particles or the gas is/are already charged by the solidification, for example, such an ionization can also be dispensed with. Equally, the ionization can also occur by way of an ionizer that is different from the deposition electrode and counter electrode. Correspondingly, the ionization means can have the deposition electrode and/or spray electrode and/or an ionizer different from these.

According to an aspect of the present invention, in order to carry out generative manufacture and/or repair of components, in particular of gas turbines, by means of the equipment described here, layers of material are arranged successively or repetitively, especially in a known way, on layers of already solidified material, in particular, by the layering means, and these layers are solidified locally by the solidifying means and bonded to the respective adjacent layer of already solidified material.

The electrodeposition means electrostatically deposits particles and/or gas before, during, and/or after the local solidification of one or more of these layers from the region between a layer of material that is to be solidified and/or is solidified and the solidifying means. In particular, the solidification and the deposition can occur successively or in parallel, with it being possible for the deposition to occur additionally before and/or after the solidification. Thus, it is advantageously possible by a deposition preceding the solidification to deposit foreign particles and/or particles already introduced by dispensing and/or distributing, so as to reduce any interference even prior to the start of solidification and, in particular, to prevent at least substantially such interference. By means of a deposition parallel to the solidification, it is advantageously possible to prevent, or at least substantially reduce, any interference of the solidification caused by smoldered residues formed during solidification, in particular, smoldered residues that have condensed to form particles. By means of a deposition subsequent to the solidification, it is advantageously possible to reduce any deposition of smoldered residues formed during solidification, in particular, of smoldered residues that have condensed to form particles, and/or of any deposition of foreign particles and preferably at least substantially prevent this.

BRIEF DESCRIPTION OF THE DRAWING FIGURES

Additional advantageous enhancements of the present invention ensue from the claims and the following description of preferred embodiments. Shown in part schematically for this purpose are:

Figure 2:
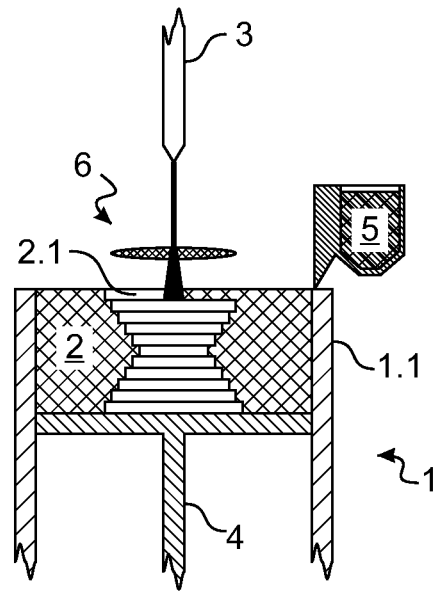
FIG. 2 shows equipment for the generative manufacture or repair according to internal company practice.

For purposes of explanation, FIG. 2 shows equipment for the generative manufacture or repair of a component according to internal company practice.

DESCRIPTION OF THE INVENTION

The equipment has a holder having a container 1 containing the material 2 to be solidified and a platform 4 that can travel with respect to the container, a solidifying means in the form of a laser head 3 that can travel for the layer-by-layer, local solidification of the material to be solidified, and a layering means for successive arrangement of layers of the material to be solidified onto layers of already solidified material, with a dispensing and distributing means 5, which can be displaced with respect to the holder, for dispensing and distributing material to be solidified for a layer of the material to be solidified.

In successive steps, the platform 4 is repeatedly lowered by one layer thickness in the container 1, and a new layer of the material to be solidified is arranged and distributed on the last solidified layer by the layering means 5, and then optically exposed locally to the solidifying means 3, and, as a result, solidified and bonded to the adjacent, last solidified layer.

During solidification, smoldered residues form, which condense in the form of particles 6 in the region between the uppermost layer 2.1 of material, which still partly remains to be solidified or is already partially solidified, and the solidifying means in the beam path of the laser 3 and thereby has a detrimental effect on the solidification. This is indicated in FIG. 2 by an undesired broadening of the laser beam.

Figure 1:
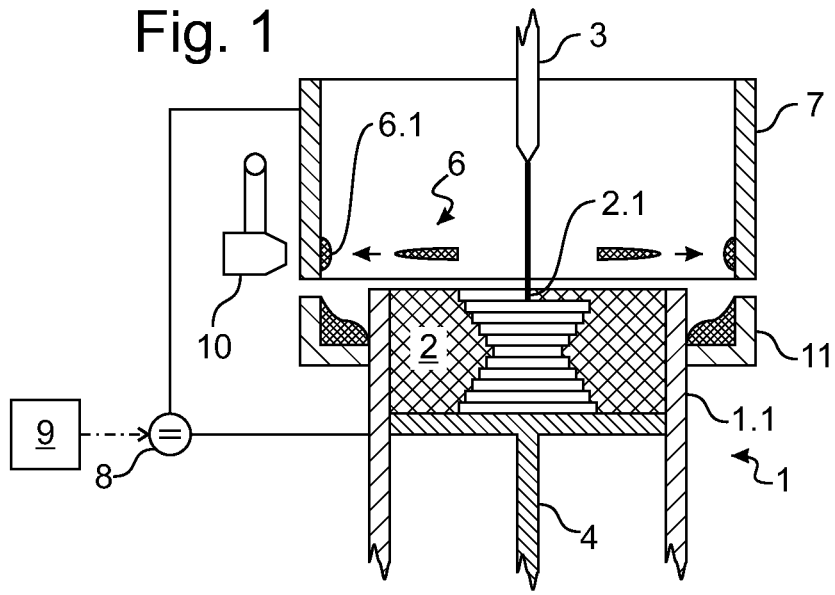
FIG. 1 shows equipment for the generative manufacture or repair of a component according to an embodiment of the present invention.

In order to reduce such interference and preferably at least substantially prevent it, an electrodeposition means of the equipment according to an embodiment of the present invention electrostatically deposits particles 6 from the region between the topmost layer 2.1 of material 2, which still partly remains to be solidified or is already partially solidified, and the solidifying means 3, as shown in FIG. 1. Here, features that correspond to each other are identified by identical reference numbers, so that reference is made to the preceding description and, in the following, only differences will be addressed. The dispensing and distributing means 5 is not depicted in FIG. 1; it can be arranged at the container 1 in each case, for example, in exchange for the electrodeposition means. In another embodiment, it also can be or is arranged in its idle or parked position, indicated in FIG. 2, inside of or outside of a deposition electrode 7 of the electrodeposition means, which is explained below.

The electrodeposition means has the already mentioned deposition electrode 7. In the exemplary embodiment, this surrounds in an annular manner the region between the topmost layer 2.1 of material, which still partly remains to be solidified or is already partially solidified, and the solidifying means 3. In a modification, which is not shown, the deposition electrode can also have, for example, one or more plates, which are arranged in FIG. 1 laterally adjacent to and/or above the container 1 and are or will be electrically insulated with respect to it.

The electrodeposition means further has a counter electrode, which is fixed in place on the container and which, in the exemplary embodiment, is formed by a container wall 1.1 of the container 1 for delimiting the material 2 to be solidified.

Furthermore, the electrodeposition means has a voltage source 8 for applying a voltage between the deposition electrode 7 and the counter electrode 1.1 and a control means 9 for controlling this voltage.

Figure 3:
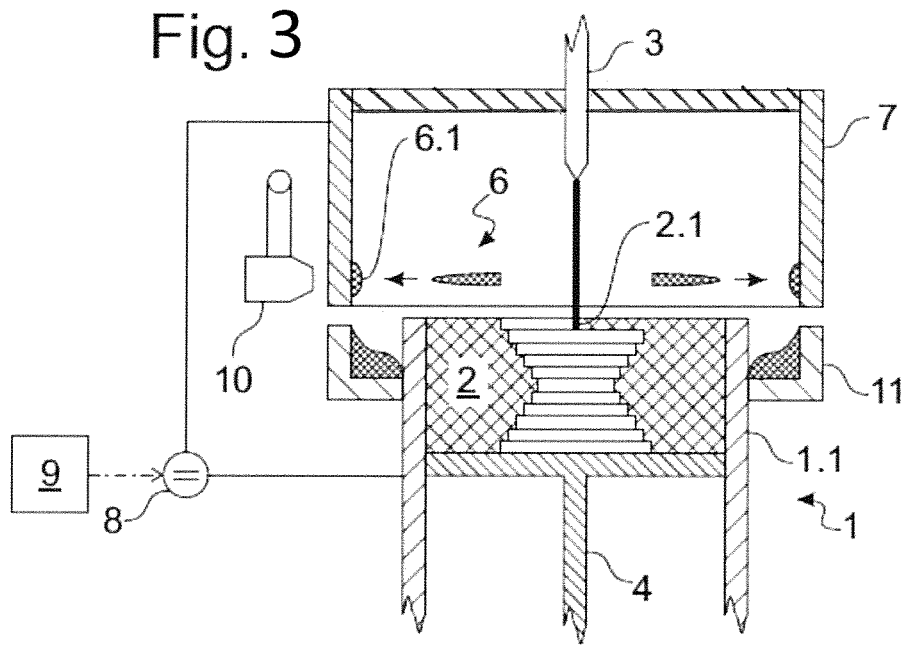
FIG. 3 shows equipment for the generative manufacture or repair of a component according to an alternative embodiment of the present invention.

The deposition electrode 7 can be fixed in placed on the container 1 or can be stationary relative to the container 1 or, in particular, by means of the control means 9, can be displaceable relative to the container 1. In a modification shown in FIG. 3, the deposition electrode 7 is fixed in place at the solidifying means or is arranged at the laser head 3 and travels together with the latter.

The electrodeposition means further has a cleaning means in the form of a hammer mechanism 10 for intermittent cleaning of the deposition electrode 7, removing particles 6.1 deposited on the deposition electrode.

The deposition electrode 7 and the counter electrode, 1.1 form an ionization means for the electrodeposition means for ionization of gas in the region between the topmost layer 2.1 of material 2, which still partly remains to be solidified or is already partially solidified, and the solidifying means 3.

Before, during, and/or after the local solidification of the layer 2.1 of the material 2, gas is ionized in the region between the topmost layer 2.1 of material 2, which still partly remains to be solidified or is already partially solidified, and the solidifying means 3 by means of applying an appropriate voltage between the deposition electrode 7 and the counter electrode 1.1 via the control means 9 by means of the voltage source 8, and the particles 6 that have been electrically charged in this way are deposited electrostatically at the deposition electrode 7. The hammer mechanism 10 intermittently cleans the deposition electrode 7 of particles 6.1 deposited on it by knocking it, said particles dropping down into a collecting bin 11.

In the preceding description, although exemplary embodiments were described, it is noted that a large number of modifications are possible. Thus, for example, instead of particles 6, gas can also be electrostatically deposited.

Moreover, it is noted that the exemplary embodiments are merely examples, which in no way limit the protective scope, the applications, and the construction. Instead, the preceding description will give the person skilled in the art a guide for implementation of at least one exemplary embodiment, with it being possible to make diverse changes, in particular in regard to the function and arrangement of the described components, without departing from the protective scope, as ensues from the claims and combinations of features equivalent to these claims.

What is claimed is:

1. Equipment for the generative manufacture and/or repair of components of gas turbines, comprising:
    a solidifying device for the layer-by-layer, local, optical, thermal, and/or chemical, solidification of powdered, granular, and/or fluid material;
    a container disposed around a vertically moveable working platform;
    a bin disposed at least partially around the container; and
    an electrodeposition device including a deposition electrode, a counter electrode and a voltage source for application of a DC or AC voltage between the deposition electrode and the counter electrode for removal of particles and/or gas through electrostatic deposition from a region between a layer of material, which is to be solidified or is solidified, and the solidifying device,
    wherein the counter electrode is vertically spaced from the deposition electrode,
    wherein the deposition electrode is vertically spaced from the bin, and
    wherein the counter electrode is disposed on or is part of the container.

2. The equipment according to claim 1, wherein the platform is configured and arranged for successive arrangement of layers of material to be solidified on layers of already solidified material, and a layering device having a dispensing device displaceable with respect to the container and/or platform, for dispensing material to be solidified.

3. The equipment according to claim 1, wherein at least one of the deposition electrode and the counter electrode is fixed in position at the solidifying device.

4. The equipment according to claim 1, wherein the electrodeposition device has a cleaning device for continuous or intermittent cleaning of the deposition electrode.

5. The equipment according to claim 1, wherein the electrodeposition device has an ionization device for ionization of gas in the region between a layer of the material that is to be solidified and/or is solidified and the solidifying device.

6. The equipment according to claim 1, wherein the counter electrode is spaced at least 1 cm and/or at most 100 cm from the deposition electrode.

7. The equipment according to claim 1, wherein the voltage source for application of a DC or AC voltage between the deposition electrode and the counter electrode, is configured to apply a DC or AC voltage of at least 15 kV and/or at most 85 kV.

8. The equipment according to claim 1, wherein the electrodeposition device further comprises a control device for controlling a voltage applied between the deposition electrode and the counter electrode.

9. The equipment according to claim 4, wherein the cleaning device comprises a hammer mechanism.

* * * * *